US010157467B2

(12) United States Patent
Dincer et al.

(10) Patent No.: US 10,157,467 B2
(45) Date of Patent: Dec. 18, 2018

(54) SYSTEM AND METHOD FOR DETECTING CENTRAL PULMONARY EMBOLISM IN CT PULMONARY ANGIOGRAPHY IMAGES

(71) Applicants: Arizona Board of Regents on Behalf of Arizona State University, Scottsdale, AZ (US); Mayo Foundation For Medical Education And Research, Rochester, MN (US)

(72) Inventors: Esra Dincer, Tempe, AZ (US); Michael Gotway, Scottsdale, AZ (US); Jianming Liang, Scottsdale, AZ (US)

(73) Assignees: Arizona Board of Regents on Behalf of Arizona State University, Scottsdale, AZ (US); Mayo Foundation For Medical Education And Research, Rochester, MN (US)

( * ) Notice: Subject to any disclaimer, the term of this patent is extended or adjusted under 35 U.S.C. 154(b) by 0 days.

(21) Appl. No.: 15/231,730

(22) Filed: Aug. 8, 2016

(65) Prior Publication Data

US 2017/0039711 A1    Feb. 9, 2017

Related U.S. Application Data

(60) Provisional application No. 62/202,562, filed on Aug. 7, 2015.

(51) Int. Cl.
*G06K 9/00* (2006.01)
*G06T 7/136* (2017.01)
(Continued)

(52) U.S. Cl.
CPC .............. *G06T 7/136* (2017.01); *G06T 7/0012* (2013.01); *G06T 7/11* (2017.01); *G06T 2200/04* (2013.01);
(Continued)

(58) Field of Classification Search
CPC ......... G06T 7/0012; G06T 2207/10081; G06T 2207/30061; G06T 2207/30101;
(Continued)

(56) References Cited

U.S. PATENT DOCUMENTS 7,526,101 B2    4/2009  Avidan
7,526,115 B2    4/2009  Bogoni et al.
(Continued)

OTHER PUBLICATIONS

Ambrose, J. et al., "Computerized Transverse Axial Scanning (Tomography)", In British Journal of Radiology, vol. 46, No. 552, Dec. 1973, pp. 1016-1023.
(Continued)

*Primary Examiner* — Li Liu
(74) *Attorney, Agent, or Firm* — Byrne Poh LLP (57) ABSTRACT

A system and method for detecting central pulmonary embolisms in a subject's vasculature is provided. In some aspects, the method includes receiving, using the input, a set of images representing a vasculature of the subject's lungs, automatically analyzing the set of images to segment the main arteries associated with the subject's lungs and separate the main arteries from surrounding tissues. The method also includes automatically extracting central pulmonary embolism candidates from the set of images after segmenting and separating the main arteries, and automatically evaluating the central pulmonary embolism candidates in three-dimensional (3D) space by applying a series of rules. The method further includes automatically displaying a report indicating evaluated central pulmonary embolism candidates on a display.

12 Claims, 5 Drawing Sheets

(51) Int. Cl.
*G06T 7/00* (2017.01)
*G06T 7/11* (2017.01)

(52) U.S. Cl.
CPC .............. *G06T 2207/10081* (2013.01); *G06T 2207/20036* (2013.01); *G06T 2207/30061* (2013.01); *G06T 2207/30101* (2013.01)

(58) Field of Classification Search
CPC .................. G06T 7/11; G06T 2200/04; G06T 2207/20036; G06T 7/12; G06T 7/136; G06T 7/155; G06T 7/73; A61B 5/02007; A61B 6/032; A61B 6/504; A61B 8/0891; G06K 2209/05
See application file for complete search history.

(56) References Cited

U.S. PATENT DOCUMENTS

| | | | |
|---|---|---|---|
| 7,599,535 B2 * | 10/2009 | Kiraly | G06T 7/60 |
| | | | 382/128 |
| 7,822,252 B2 | 10/2010 | Bi et al. | |
| 7,840,061 B2 | 11/2010 | Porikli et al. | |
| 7,912,278 B2 | 3/2011 | Fung et al. | |
| 7,965,810 B2 | 6/2011 | Roy et al. | |
| 7,986,827 B2 | 7/2011 | Rao et al. | |
| 8,244,012 B2 | 8/2012 | Liang et al. | |
| 8,280,136 B2 | 10/2012 | Gotardo et al. | |
| 8,900,149 B2 | 12/2014 | He et al. | |
| 2002/0009215 A1 * | 1/2002 | Armato, III | G06K 9/38 |
| | | | 382/131 |
| 2002/0114503 A1 * | 8/2002 | Klotz | G06T 7/0012 |
| | | | 382/131 |
| 2003/0199762 A1 | 10/2003 | Fritz et al. | |
| 2005/0220336 A1 | 10/2005 | Sabe et al. | |
| 2006/0018549 A1 | 1/2006 | Liang et al. | |
| 2006/0209063 A1 | 9/2006 | Liang et al. | |
| 2007/0058870 A1 * | 3/2007 | Liang | G06T 7/0012 |
| | | | 382/190 |
| 2008/0008369 A1 * | 1/2008 | Koptenko | G06K 9/4604 |
| | | | 382/128 |
| 2008/0009733 A1 | 1/2008 | Saksena | |
| 2008/0154565 A1 | 6/2008 | Florin et al. | |
| 2008/0170763 A1 * | 7/2008 | Begelman | A61B 5/02007 |
| | | | 382/128 |
| 2008/0171939 A1 | 7/2008 | Ishihara | |
| 2008/0240532 A1 | 10/2008 | Carneiro et al. | |
| 2009/0034816 A1 * | 2/2009 | Ghanem | G06T 7/0012 |
| | | | 382/131 |
| 2009/0252394 A1 * | 10/2009 | Liang | G06K 9/00201 |
| | | | 382/131 |
| 2010/0098308 A1 | 4/2010 | Lakare et al. | |
| 2010/0113930 A1 | 5/2010 | Miyachi | |
| 2010/0177944 A1 | 7/2010 | Madabhushi et al. | |
| 2011/0252394 A1 | 1/2011 | Sharma et al. | |
| 2011/0243403 A1 * | 10/2011 | Mizuno | G06T 7/0012 |
| | | | 382/128 |
| 2011/0270089 A1 | 11/2011 | Vezina | |
| 2012/0089545 A1 | 4/2012 | Mei et al. | |
| 2012/0224765 A1 * | 9/2012 | Kim | G06K 9/325 |
| | | | 382/159 |
| 2012/0274755 A1 | 11/2012 | Sinha et al. | |
| 2016/0125614 A1 * | 5/2016 | Chen | G06T 7/0085 |
| | | | 345/620 |

OTHER PUBLICATIONS

Armato, S. et al., "Automated Detection of Lung Nodules in CT Scans: Preliminary Results", In Medical Physics, vol. 28, No. 8, Aug. 2001, pp. 1552-1561.

Baker, M. et al., "Computer-Aided Detection of Colorectal Polyps: Can it Improve Sensitivity of Less-Experienced Readers? Preliminary Findings 1", In Radiology, vol. 245, No. 1, Oct. 2007, pp. 140-149.

Bamberger, P. et al., "A New Generation Algorithm for Digital Mammography Designed to Reproduce the Performance of Expert Radiologists in Detecting Actionable Clusters", In European Radiology Supplements, vol. 18, No. 1, 2008, pp. 152.

Becattina et al., "Multidetector Computed Tomography for Acute Pulmonary Embolism: Diagnosis and Risk Stratification in a Single Test", In European Heart Journal, vol. 32, No. 13, Apr. 2011, pp. 1657-1663.

Bi, J. and Liang, J., "Multiple Instance Learning of Pulmonary Embolism Detection with Geodesic Distance Along Vascular Structure", In Proceedings of IEEE Computer Society Conference on Computer Vision and Pattern Recognition (CVPR'07), Minneapolis, MN, US, Jun. 18-23, 2007, pp. 1-8.

Bi, J. et al., "An Improved Multi-Task Learning Approach with Applications in Medical Diagnosis", In Proceedings of Joint European Conference on Machine Learning and Knowledge Discovery in Databases, Antwerp, BE, Sep. 15-19, 2008, pp. 117-132.

Bi, J. et al., "Computer-Aided Detection via Asymmetric Cascade of Sparse Hyperplane Classifiers", In Proceedings of ACM SIGKDD International Conference on Knowledge Discovery and Data Mining, Philadelphia, PA, US, Aug. 20-23, 2006, pp. 1-9.

Bi, J. et al., "Dimensionality Reduction via Sparse Support Vector Machines", In the Journal of Machine Learning Research, vol. 3, Mar. 2003, pp. 1229-1243.

Blackmon, K.N. et al., "Computer-Aided Detection of Pulmonary Embolism at CT Pulmonary Angiography: Can it Improve Performance of Inexperienced Readers?", In European Radiology, vol. 21, Jun. 2011, pp. 1214-1223.

Bogoni, L. et al., "Computer-Aided Detection (CAD) for CT Colonography: A Tool to Address a Growing Need", In British Journal of Radiology, vol. 78, Jan. 2005, pp. s57-s62.

Boser, B. et al., "A Training Algorithm for Optimal Margin Classifiers", In Proceedings of the 5th Annual ACM Workshop on Computational Learning Theory, Pittsburgh, PA, US, Jul. 27-29, 1992, pp. 144-152.

Bouma, H. et al., "Automatic Detection of Pulmonary Embolism in CTA Images", In Medical Imaging, IEEE Transactions, vol. 28, No. 8, Aug. 2009, pp. 1223-1230.

Bouma, H., "Vessel Diameter Quantification and Embolus Detection in CTA Images", PhD Thesis, Technische Universiteit Eindhoven, Eindhoven, NL, 2008, pp. 1-161.

Bourdev, L. et al., "Robust Object Detection via Soft Cascade", In Proceedings of IEEE Computer Society Conference on Computer Vision and Pattern Recognition (CVPR'05), San Diego, CA, US, Jun. 20-26, 2005, pp. 1-8.

Breiman, L. "Bagging Predictors", In Machine Learning, vol. 24, No. 2, Aug. 1996, pp. 123-140.

Buhmann, S. et al., "Clinical Evaluation of a Computer-Aided Diagnosis (CAD) Prototype for the Detection of Pulmonary Embolism", In Academic Radiology, vol. 14, Feb. 2007, No. 6, pp. 651-658.

Cannesson, M. et al., "A Novel Two-Dimensional Echocardiographic Image Analysis System Using Artificial Intelligence-Learned Pattern Recognition for Rapid Automated Ejection Fraction", In the Journal of the American College of Cardiology, vol. 49, No. 2, Jan. 2007, pp. 217-226.

Chartrand-Lefebvre, C., "Computed Tomography Angiography in the Diagnosis of Pulmonary Embolism: Interobserver Agreement", In the American Journal of Emergency Medicine, Jan. 2011; vol. 29, No. 1, pp. 118-119.

Chen, Y. et al., "MILES: Multiple-Instance Learning via Embedded Instance Selection", In IEEE Transactions on Pattern Analysis and Machine Intelligence, vol. 28, No. 12, Dec. 2006, pp. 1-17.

Cho, E.J. et al., "Right Ventricular Free Wall Circumferential Strain Reflects Graded Elevation in Acute Right Ventricular Afterload", In the American Journal of Physiology: Heart and Circulatory Physiology, vol. 296. No. 2., Feb. 2009, pp. H413-H420.

Costantino, G. et al., "Interobserver Agreement in the Interpretation of Computed Tomography in Acute Pulmonary Embolism", In the American Journal of Emergency Medicine, vol. 27, No. 9, Nov. 2009, pp. 1109-1111.

Craig, J.J., "Introduction to Robotics: Mechanics and Control", 3rd edition, Prentice Hall, Aug. 2004, pp. 1-374.

(56) References Cited

OTHER PUBLICATIONS

Criminisi, A. et al., "Regression Forests for Efficient Anatomy Detection and Localization in CT Studies", In International MICCAI Workshop on Medical Computer Vision, Sep. 2010, pp. 106-117.
Crow, F.C., "Summed-Area Tables for Texture Mapping", In Computer Graphics, vol. 8, No. 3 Jul. 1984, pp. 207-212.
Das, M. et al., "Computer-Aided Detection of Pulmonary Embolism: Influence on Radiologists' Detection Performance with Respect to Vessel Segments", In European Radiology, vol. 18. No. 7, Jul. 2008, pp. 1350-1355.
Diettrich, T. el al., "Solving the Multiple Instance Problem with Axis-Parallel Rectangles", In Artificial Intelligence, vol. 89, No. 1-2, Jan. 1997, pp. 31-71.
Dinesh, M.S. et al., "Adaptive Contrast-Based Computer-Aided Detection for Pulmonary Embolism", In SPIE Medical Imaging: Computer-Aided Diagnosis, Mar. 2009, pp. 1-8.
Dollar, P. et al., "Multiple Component Learning for Object Detection", In Proceedings of European Conference on Computer Vision, Marseilles, FR, Oct. 12-18, 2008, pp. 211-224.
Dousset et al., "Principles and Performance of Virtual CT and MIRA Intraluminal Endoscopy", In Virtual Endoscopy, Nov. 2002, pp. 1-19.
Dundar, M. et al., "A Methodology for Training and Validating a CAD System and Potential Pitfalls", In International Congress Series, vol. 1268, Jun. 2004, 1010-1014.
Dundar, M. et al., "Joint Optimization of Cascaded Classifiers for Computer Aided Detection", In Proceedings of IEEE Computer Society Conference on Computer Vision and Pattern Recognition, Minneapolis, MN, US, Jun. 17-22, 2007, pp. 1-8.
Dundar, M. et al., "Multiple Instance Learning Algorithms for Computer Aided Detection", In IEEE Transactions on Biomedical Engineering, vol. 55, No. 3, Mar. 2008, pp. 1015-1021.
Dundar, M. et al., "Polyhedral Classifier for Target Detection A Case Study: Colorectal Cancer", In Proceedings of the 25th International Conference on Machine Learning, Helsinki, FI, Jul. 5-9, 2008, pp. 288-295.
Dundar, M. et al., "Sparse Fisher Discriminant Analysis for Computer Aided Detection", In Proceedings of SIAM International Conference on Data Mining, Newport Beach, CA, US, Apr. 21-23, 2005, pp. 1-8.
Fairfield, J., "Toboggan Contrast Enhancement for Contrast Segmentation", In Proceedings of 10th IEEE International Conference on Pattern Recognition, vol. 1, Aug. 1990, pp. 712-716.
Frangi, A.F. et al., "Mulliscale Vessel Enhancement Filtering", In Proceedings of International Conference on Medical Image Computing and Computer-Assisted Intervention, Cambridge, MA, US, Oct. 11-13, pp. 130-137.
Freund, Y. and Schapire, R.E., "A Decision-Theoretic Generalization of Online Learning and an Application to Boosting", In Proceedings of European Conference on Computational Learning Theory, Barcelona, ES, Mar. 13-15, 1995, pp. 119-139.
Freund, Y. et al., "A Short Introduction to Boosting", In Japanese Society for Artificial Intelligence Journal, vol. 14, No. 5, Sep. 1999, pp. 771-780.
Freund, Y. et al., "Experiments with a New Boosting Algorithm", In Proceedings of 13th International Conference on Machine Learning, Bari, IT, Jul. 3-6, 1996, pp. 148-156.
Galson, S.K., "The Surgeon General's Call to Action to Prevent Deep Vein Thrombosis and Pulmonary Embolism", U.S. Department of Health and Human Services, 2008, pp. 1-49.
Georgescu, B. et al., "Real-Time Multi-Model Tracking of Myocardium in Echocardiography using Robust Information Fusion", In Lecture Notes in Computer Science, vol. 3217, Sep. 2004, pp. 777-785.
Godec, M. et al., "Online Random Naive Bayes for Tracking", In Proceedings of IEEE 20th International Conference on Pattern Recognition (ICPR'10), Istanbul, TR, Aug. 23-26, 2010, pp. 3545-3548.
Grabner, H. and Bischof, H., "Online Boosting and Vision", In Proceedings of IEEE Computer Society Conference on Computer Vision and Pattern Recognition (CVPR'06), New York, NY, US, Jun. 17-22, 2006, pp. 1-8.
Grbovic, M. and Vucetic, S., "Tracking Concept Change with Incremental Boosting by Minimization of the Evolving Exponential Loss", In Proceedings of the European Conference, Athens, GE, Sep. 5-9, 2011, pp. 516-532.
Groth, M. et al., "Correlation of Right Ventricular Dysfunction Parameters and Pulmonary Vascular Obstruction Score in Acute Pulmonary Embolism in a Porcine Model", In Emergency Radiology, vol. 17, Sep. 2010, No. 5, pp. 367-374.
He, H. et al., "Incremental Learning from Stream Data", In IEEE Transactions on Neural Networks, vol. 22, No. 12, Dec. 2011, pp. 1901-1914.
Ho, T. "The Random Subspace Method for Constructing Decision Forests", In IEEE Trans Pattern Analysis and Machine Intelligence, vol. 20, No. 8, Aug. 1998, pp. 832-844.
Hoeting, J. et al., "Bayesian Model Averaging: A Tutorial", In Statistical Science, vol. 14, No. 4, Nov. 1999, pp. 382-401.
Hounsfield, G. et al., "Computerized Transverse Axial Scanning (Tomography)", In British Journal of Radiology, vol. 46, No. 552, Dec. 1973, pp. 1016-1023.
International Patent Application No. PCT/US2012/024675, filed Feb. 4, 2013.
International Patent Application No. PCT/US2012/024677, filed Feb. 4, 2013.
International Preliminary Report on Patentability dated Jun. 19, 2012 in International Application No. PCT/US2012/024925.
International Preliminary Report on Patentability dated Aug. 22, 2013 in International Application No. PCT/US2012/024907.
International Search Report dated Apr. 15, 2013 in International Patent Application No. PCT/US2013/024677.
International Search Report dated Apr. 16, 2013 in International Patent Application No. PCT/US2013/024675.
International Search Report dated Jun. 19, 2012 in International Patent Application No. PCT/US2012/024925.
Kanitsar, A. et al., "CPR: Curved Planar Reformation", In Proceedings of IEEE Visualization Conference, Boston, MA, US, Oct. 27-Nov. 1, 2002, pp. 37-44.
Kanne, J.P. et al., "Detection of Central Pulmonary Embolism on Computed Tomography Densitometry Images Before Computed Tomography Pulmonary Angiography", In Journal of Computer Assisted Tomography, vol. 27, No. 6, Nov. 2003, pp. 907-910.
Kim, T.K. et al., "Online Multiple Classifier Boosting for Object Tracking", In Proceedings of the IEEE Computer Society Conference on Computer Vision and Pattern Recognition Workshops (CVPRW), San Francisco, CA, US, Jun. 13-18, 2010, pp. 1-6.
Kiraly, A.P. et al., "Cartwheel Projections of Segmented Pulmonary Vasculature for the Detection of Pulmonary Embolism", In Medical Imaging 2005: Visualization, Image-Guided Procedures, and Display, Proc. of SPIE, vol. 5744, Apr. 2005, pp. 69-78.
Knutsson, H. et al., "Representing Local Structure Using Tensors", In Proceedings of 6th Scandinavian Conference on Image Analysis, Oulu, FI, Jun. 19-22, 1989, pp. 244-251.
Kothe, U., "Edge and Junction Detection with an Improved Structure Tensor", In Proceedings of 25th Symposium of the German Association of Pattern Recognition (DAGM), Magdeburg, DE, Sep. 10-12, 2003, pp. 25-32.
Krishnapuram, B. et al., "Multiple Instance Learning Improves CAD Detection of Masses in Digital Mammography", In Proceedings of the 9th International Workshop on Digital Mammography, Tucson, AZ, US, Jul. 20-23, 2008, pp. 350-357.
Kurkure, U. et al., "Automated Segmentation of Thoracic Aorta in Non-Contrast CT Images", In Proceedings of the 5th International Symposium on Biomedical Imaging: From Nano to Macro (ISBI '08), Paris, FR, May 14-17, 2008, pp. 29-32.
Leistner, C. et al., "On Robustness of On-Line Boosting: A Competitive Study", In Proceedings of the 2009 IEEE 12th International Conference on Computer Vision Workshops (ICCV '09), Kyoto, JP, Sep. 27-Oct. 4, 2009, pp. 1362-1369.
Liang, J. and Bi, J., "Computer-Aided Detection of Pulmonary Embolism with Tobogganing and Multiple Instance Classification in (56) References Cited

OTHER PUBLICATIONS

CT Pulmonary Angiography", In Proceedings of Conference on Information Processing in Medical Imaging, Kerkrade, NL, Jul. 2-6, 2007, pp. 630-641.

Liang, J. and Bi, J., "Local Characteristic Features for Computer-Aided Detection of Pulmonary Embolism in CT Angiography", In Proceedings of the First Workshop on Pulmonary Image Analysis, New York, NY, US, Sep. 6, 2008, pp. 263-272.

Liu, D. et al., "Search Strategies for Multiple Landmark Detection by Submodular Maximization", In Proceedings of IEEE Conference on Computer Vision and Pattern Recognition, San Francisco, CA, US, Jun. 15-17, 2010, pp. 2831-2838.

Liu, X. and Yu, T., "Gradient Feature Selection for Online Boosting", In Proceedings of the IEEE 11th International Conference on Computer Vision (ICCV '07), Rio de Janeiro, BR, Oct. 14-21, 2007, pp. 1-8.

Lorenz, C. et al., "Multi-Scale Line Segmentation with Automatic Estimation of Width, Contrast and Tangential Direction in 2D and 3D Medical Images", In Proceedings of CVRMed-MRCAS'97, Grenoble, FR, Mar. 19-22, 1997, pp. 233-242.

Maizlin, Z. et al. "Computer-Aided Detection of Pulmonary Embolism on CT Angiography: Initial Experience", In Journal of Thoracic Imaging, vol. 23, No. 1, Feb. 2008, pp. 59-59.

Maron, O. et al., "A Framework for Multiple Instance Learning", In Advances in Neural Information Processing Systems, vol. 10, Jul. 1998, pp. 570-576.

Masutani, Y. et al., "Computerized Detection of Pulmonary Embolism in Spiral CT Angiography Based on Volumetric Image Analysis", In IEEE Transactions on Medical Imaging, vol. 21, No. 12, Dec. 2002, 1517-1523.

Musani, M.H., "Asymptomatic Saddle Pulmonary Embolism: Case Report and Literature Review", In Clinical and Applied Thrombosis/Hemostasis, vol. 17, No. 4, Aug. 2011, pp. 337-339.

Naidich D. et al., "Computer Aided Diagnosis: Impact on Nodule Detection Amongst Community Level Radiologist—A Multi-Reader Study", In Proceedings of the 18th International Congress Series, Computer Assisted Radiology and Surgery, Chicago, IL, US, Jun. 23-26, 2004, pp. 902-907.

Ouellette, D.R. et al., "Pulmonary Embolism", In Medscape.com, last updated Jun. 22, 2016, pp. 1-15, available at: http://emedicine.medscape.com/article/300901-overview#showall.

Oza, N.C. "Online Bagging and Boosting", In Proceedings of IEEE International Conference on Systems, Man and Cybernetics, Waikoloa, HI, US, Oct. 10-12, 2005, pp. 2340-2345.

Ozkan, H. et al., "A Novel Method for Pulmonary Embolism Detection in CTA Images", In Computer Methods and Programs in Biomedicine, vol. 113, No. 3. Mar. 2014, pp. 757-766.

Parag, T. et al., "Boosting Adaptive Linear Weak Classifiers for Online Learning and Tracking", In Proceedings of the IEEE Conference on Computer Vision and Recognition (CVPR '08), Anchorage, AK, US, Jun. 23-28, 2008, pp. 1-8.

Parikh, D. and Polikar, R., "An Ensemble-Based Incremental Learning Approach to Data Fusion", In IEEE Transactions on Systems, Man, Cybernetics, Part B: Cybernetics, vol. 37, No. 2, Apr. 2007, pp. 437-450.

Pelossof, R. et al., "Online Coordinate Boosting", In Proceedings of the 2009 IEEE 12th International Conference on Computer Vision Workshops, (ICCVW '09), Kyoto, JP, Sep. 27-Oct. 4, 2009, pp. 1354-1361.

Pham, M. and Cham, T., "Detection with Multi-exit Asymmetric Boosting", In Proceedings of the IEEE Conference on Computer Vision and Pattern Recognition (CVPR '08), Anchorage, AK, US, Jun. 23-28, 2008, pp. 1-8.

Pham, M.T. and Cham, T.J., "Fast Training and Selection of Haar Features using Statistics in Boosting-Based Face Detection", In Proceedings of IEEE 11th International Conference on Computer Vision (ICCV '07), Rio de Janeiro, BR, Oct. 14-21, 2007, pp. 1-7.

Pruszczyk, P. et al., "Short Term Clinical Outcome of Acute Saddle Pulmonary Embolism", In Heart, vol. 89 No. 3, Mar. 2003, pp. 335-336.

Raykar, V. et al., "Bayesian Multiple Instance Learning: Automatic Feature Selection and Inductive Transfer", In Proceedings of the 25th International Conference on Machine Learning, Helsinki, FI, Jul. 5-9, 2008, pp. 808-815.

Raykar, V. et al., "Supervised Learning from Multiple Experts: Whom to Trust When Everyone Lies a Bit", In Proceedings of the 26th International Conference on Machine Learning, Montreal, QC, CA, Jun. 14-18, 2009, pp. 1-8.

Remy-Jardin, M. et al., "Central Pulmonary Thromboembolism: Diagnosis with Spiral Volumetric CT with the Single Breath Hold Technique—Comparison with Pulmonary Angiography", In Radiology, vol. 185, No. 2, Nov. 1992, pp. 381-387.

Sandler, D. and Martin, J., "Autopsy Proven Pulmonary Embolism in Hospital Patients: Are We Detecting Enough Deep Vein Thrombosis?", In Journal of the Royal Society of Medicine, vol. 82, No. 4, Apr. 1989, pp. 203-205.

Sato, Y. et al., "3-D Multi-Scale Line Filter for Segmentation and Visualization of Curvilinear Structures in Medical Images", In Proc. of the First Joint Conf. on Computer Vision, Virtual Reality and Robotics in Medicine and Medical Robotics and Computer-Assisted Surgery, Grenoble, FR, Mar. 19-22, 1997, pp. 213-222.

Schapire, R.E. and Singer, Y., "BoosTexter: A Boosting-Based System for Text Categorization", In Machine Learning, vol. 39, No. 2, May 1, 2000, pp. 135-168.

Schapire, R.E., "Theoretical Views of Boosting and Applications", In Algorithmic Learning Theory, Lectrure Notes in Computer Science, vol. 1720, Dec. 1999, pp. 13-25.

Sebbe, R., "Computer-Aided Diagnosis of Pulmonary Embolism in Opacified CT Images", Ph.D. Dissertation, Faculte Polytechnique de Mons, Universite D'Orleans, BE, Nov. 2007, pp. 1-137.

Silverstein, M.D. et al., "Trends in the Incidence of Deep Vein Thrombosis and Pulmonary Embolism: A 25-Year Population-Based Study", In Archives of Internal Medicine, vol. 158, No. 6, Mar. 1998, pp. 585-593.

Simon, M. et al. "Paddle-wheel Multislice Helical CT Display of Pulmonary Vessels and Other Lung Structures", In Radiology Clinics of North America, vol. 41, No. 3, May 2003, pp. 617-626.

Simon, M. et al., "Paddle-wheel CT Display of Pulmonary Arteries and Other Lung Structures: A New Imaging Approach", In American Journal of Roentgenology, vol. 177, No. 1, Jul. 2001, pp. 195-198.

Society of Interventional Radiology, "Deep Vein Thrombosis Overview", In Deep Vein Thrombosis and Pulmonary Embolism Overview, last accessed: Aug. 12, 2016, pp. 1-3, available at: https://www.sirweb.org/patient-center/deep-vein-thrombosis/.

Spencer, F.A. et al., "The Worcester Venous Thromboembolism Study: A Population-based Study of the Clinical Epidemiology of Venous Thromboembolism", In Journal of General Internal Medicine, vol. 21, No. 7, Jul. 2006, pp. 722-727.

Stein, P.D. and Hull, R.D., "Multidetector Computed Tomography for the Diagnosis of Acute Pulmonary Embolism", In. Current Opinion in Pulmonary Medicine, vol. 13, No. 5, Sep. 2007, pp. 384-388.

Stein, P.D. et al., "Silent Pulmonary Embolism in Patients with Deep Venous Thrombosis: A Systematic Review", In American Journal of Medicine, vol. 123, No. 5, May 2010, pp. 426-431.

Sternig, S., et al., "Transient Boost: Online Boosting with Transient Data", In Proceedings of the 2010 IEEE Computer Society Conference on Computer Vision and Pattern Recognition Workshops (CVPRW '10), San Francisco, CA, US, Jun. 13-18, 2010, pp. 22-27.

Stoeckel, J. et al., "SVM Feature Selection for Classification of Spect Images of Alzheimer's Disease Using Spatial Information", In Knowledge and Information Systems, vol. 11, No. 2, Feb. 2007, 243-258.

Sun, S. et al., "Detection of Central Pulmonary Embolism on Non-contrast Computed Tomography: A Case Control Study", In the International Journal of Cardiovascular Imaging, vol. 30, No. 3, Mar. 2014, pp. 639-646.

Suzuki, K. et al., "Radiologic Classification of Small Adenocarcinoma of the Lung: Radiologic-Pathologic Correlation and Its Prognostic Impact", In Annals of Thoracic Surgery, vol. 81, No. 2, Feb. 2006, pp. 413-419.

(56) References Cited

OTHER PUBLICATIONS

Tajbakhsh, N. et al., "A Novel Online Boosting Algorithm for Automatic Anatomy Detection", Machine Vision and Applications, vol. 24, No. 7, Oct. 2013, pp. 1359-1370.

Torbicki, A. et al., "Guidelines on the Diagnosis and Management of Acute Pulmonary Embolism: The Task Force for the Diagnosis and Management of Acute Pulmonary Embolism of the European Society of Cardiology (ESC)", In European Heart Journal, vol. 29, No. 18, Sep. 2008, pp. 2276-2315.

Tsai, H. et al., "Intelligent Pulmonary Embolism Detection System", In Biomedical Engineering: Applications, Basis and Communications, vol. 24, No. 6, Nov. 2012, pp. 471-483.

Vaidehi, V. et al., "Multiclass Object Detection System in Imaging Sensor Network Using Haar-like Features and Joint-Boosting Algorithm", In Proceedings of International Conference on Recent Trends in Information Technology (ICRTIT '11), Chennai, Tamil Nadu, IN, Jun. 3-5, 2011, pp. 1011-1015.

Vedovati, M.C. et al., "Multidetector CT Scan for Acute Pulmonary Embolism Embolic Burden and Clinical Outcome", In Chest, vol. 142, No. 6, Dec. 2012, pp. 1417-1424.

Viola, P. and Jones M., "Fast and Robust Classification Using Asymmetric AdaBoost and a Detector Cascade", In Advances in Neural Information Process System, vol. 14, Apr. 2002, pp. 1311-1318.

Viola, P. and Jones, M., "Rapid Object Detection using a Boosted Cascade of Simple Features", In the Proceedings of the IEEE Computer Society Conference on Computer Vision and Pattern Recognition (CVPR 2001), Kauai, HI, US, Dec. 8-14, 2001, pp. 511-518.

Costantino, G. et al., "Interobserver Agreement in Computer Tomography Readings for Pulmonary Embolism", In the American Journal of Emergency Medicine, vol. 29, No. 1, Jan. 2011, pp. 119.

Vural, V. et al., "Batch Classification with Applications in Computer Aided Diagnosis", In Lecture Notes in Computer Science, vol. 4212, Sep. 2006, pp. 449-460.

Vural, V. et al., "Using Local Dependencies within Batches to Improve Large Margin Classifiers", In Journal of Machine Learning Research, vol. 10, Feb. 2009, pp. 183-206.

Wittenberg, R. et al., "Acute Pulmonary Embolism: Effect of a Computer-Assisted Detection Prototype on Diagnosis—An Observer Study", In Radiology, vol. 262, No. 1, Jan. 2012, pp. 305-313.

Written Opinion dated Apr. 15, 2013 in International Patent Application No. PCT/US2013/024677.

Written Opinion dated Apr. 16, 2013 in International Patent Application No. PCT/US2013/024625.

Written Opinion dated Jun. 19, 2012 in International Patent Application No. PCT/US2012/024925.

Wu, B. and Nevatia, R., "Improving Part Based Object Detection by Unsupervised, Online Boosting", In Proceedings of the IEEE Conference on Computer Vision and Pattern Recognition (CVPR '07), Minneapolis, MN, US, Jun. 17-22, 2007, pp. 1-8.

Wu, D. et al., "A Min-Max Framework of Cascaded Classifier with Multiple Instance Learning for Computer Aided Diagnosis," In Proceedings of IEEE International Conference on Computer Vision and Pattern Recognition, Miami, FL, US, Jun. 20-25, 2009, pp. 1359-1366.

Wu, H. et al., "Machine Learning-Based Automatic Detection of Pulmonary Trunk", In SPIE Medical Imaging, Mar. 2011, pp. 1-6.

Zheng, Y. et al., "Automatic Aorta Segmentation and Valve Landmark Detection in C-Arm CT: Application to Aortic Valve Implantation", In IEEE Transactions on Medical Imaging, vol. 31, No. 12, Dec. 2012, pp. 2307-2321.

Zheng, Y. et al., "Fast Automatic Heart Chamber Segmentation from 3D CT Data Using Marginal Space Learning and Steerable Features", In Proceedings of the IEEE 11th International Conference on Computer Vision (ICCV '07), Rio de Janeiro, BR, Oct. 14-21, 2007, pp. 1-8.

Zhou, C. et al., "Computerized Detection of Pulmonary Embolism in 3D Computed Tomographic (CT) Images: Vessel Tracking and Segmentation Techniques", In Medical Imaging, vol. 5032, May 2003, pp. 1613-1620.

Zhou, C. et al., "Preliminary Investigation of Computer-Aided Detection of Pulmonary Embolism in Three-Dimensional Computed Tomography Pulmonary Angiography Images", In Academic Radiology, vol. 12, No. 6, Jan. 2005, pp. 782-792.

Zhou, C., et al., "Automatic Pulmonary Vessel Segmentation in 3D Computed Tomographic Pulmonary Angiographic (CTPA) Images", In Proceedings of the SPIE 6144, Medical Imaging: Image Processing, Mar. 15, 2006, pp. Q1-Q7.

Zhu, J. et al., "1—Norm Support Vector Machines", In Advances in Neural Information Processing Systems, vol. 15, Dec. 2003, pp. 49-56.

Zou, X., et al., "Anatomy-Based Automatic Detection and Segmentation of Major Vessels in Thoracic CTA Images", In Computerized Medical Imaging and Graphics, vol. 30, No. 5, Jul. 2006, pp. 299-313.

\* cited by examiner

SYSTEM AND METHOD FOR DETECTING CENTRAL PULMONARY EMBOLISM IN CT PULMONARY ANGIOGRAPHY IMAGES

CROSS-REFERENCE TO RELATED APPLICATIONS

This application is based on, claims priority to, and incorporates herein by reference in its entirety, U.S. Provisional Application Ser. No. 62/202,562, filed Aug. 7, 2015, and entitled "Systems and Methods for Detecting Central Pulmonary Embolism in CT Pulmonary Angiography Images."

STATEMENT REGARDING FEDERALLY SPONSORED RESEARCH

N/A

BACKGROUND

Acute pulmonary embolisms (PEs) occurs when venous thrombi are dislodged and travel through the vascular system and partially or completely occlude the pulmonary artery. There are no clinical signs or symptoms that are specific for PEs because many of the presenting features are common among patients without PEs, rendering this diagnosis challenging. PEs represent a relatively common cardiovascular emergency with about 600,000 cases occurring annually, causing approximately 200,000 deaths in the US. According to one retrospective study covering a 25-year span, the annual incidence of pulmonary embolism is 69 per 100 thousand. In another study, the PE incidence rate in the Worcester Statistical Metropolitan Area was reported to be 27%. Pulmonary embolism was thought to be the cause of death in 239 of 2388 autopsies performed. The unsuspected or undiagnosed ante mortem PE rate at autopsy may be as high as 78% (1902/2448). With early diagnosis and treatment, the mortality rate can be reduced to less than 11%.

Pulmonary embolisms do not have consistent sizes or morphologies, and the affected pulmonary arteries may be obstructed completely or partially. When embolic obstruction is complete, the entire arterial cross-section is occluded with embolic material causing the normally enhanced vascular lumen to show low attenuation. When partially occlusive embolic disease is present, enhanced blood partially surrounds intravascular emboli creating the appearance of low-attenuation intravascular material either seen floating within the vessel lumen or in contact with the lumen wall.

Central PEs may be located in the main, left or right pulmonary arteries. Detecting central PEs is critical because the major pulmonary arterial obstruction can significantly compromise pulmonary perfusion and impair right ventricular function and result in sudden death. In one study, 579 patients were evaluated and, in 516 hemodynamically stable patients, central localization of emboli was an independent predictor of all-cause death or clinical deterioration while distal emboli were inversely associated with these outcome events. In a study on detection of central PE on unenhanced CT, of the 88 studies positive for pulmonary emboli, 64% had central involvement. In another study, clinically "silent" PE—an unexpected postmortem finding—was found in 32% of patients and may affect the central pulmonary arteries. Saddle PE, which may be in the main artery, was diagnosed in 17 (5.2%) cases of 289 patients with acute PE confirmed by spiral CT. In one study, 12.1% of 214 examinations had central clots. In a landmark study that initially described the CT technique now widely used for suspected pulmonary embolism assessment, 37% partially and 46% completely occlusive pulmonary arterial filling defects were found in 42 patients with central PE.

The primary imaging technique utilized for PE diagnosis is computed tomography pulmonary angiogram (CTPA), where PEs appear as a low-attenuation filling defects within the normally highly attenuating, enhanced pulmonary arteries. In particular, a "dark" or hypo-attenuating region within a pulmonary artery represents a region of the vessel where intravenous contrast was excluded, indicating the presence of an PE candidate. Analysis by a radiologist typically involves the careful tracing each branch of the pulmonary vasculature in order to look for and identify suspected PEs. Although it is easier to detect central PEs compared to sub-segmental PEs, for instance, central PEs are often overlooked by human readers. This is because of the large number of arteries that have to be tracked as well as complexity and number of the images, with typical CTPA datasets having up to 500 individual images. Hence, PE diagnosis often requires extensive reading time whose accuracy depends on a clinician's experience, attention span, eye fatigue, as well as sensitivity to the visual characteristics of different PEs.

Computer aided diagnosis (CAD) systems for PE detection have been utilized as a "second pair of eyes" in the clinical setting, in the attempt to improve the radiologists' performance. However, computer-aided detection is a challenging task because the images are complex and include artifacts, and vary in imaging conditions. CAD systems for PE detection are typically focused on segmental and sub-segmental emboli, with only very few being capable of detecting central emboli. This is because such systems generally apply a lung segmentation that excludes the main, left and right pulmonary arteries and, as a result, central emboli are likely missed. For example, the CAD product developed for Philips is unlikely to be capable of detecting large or central emboli. The system developed by Siemens detects 88.5% of emboli affecting central pulmonary arteries.

In one study, a computationally expensive methodology was used to segment the pulmonary trunk, left and right pulmonary artery to detect central PE from 33 cases, achieving a 14.4 FP/ds rate with 95.1% sensitivity. In another study, an active contour model was used to extract the pulmonary arterial tree, employing a k-means algorithm and the Gaussian mixture models for main vessel searching and using a skeleton model for vessel tracking. The detection system employed a relatively sophisticated algorithms, and achieved a 3.8% FP/ds overall performance rate, but with a small sample size of only 16 cases. In yet another study, an expectation-maximization analysis was used. The vessel tree was reconstructed and a rule-based method was used to detect PE. An initial seed point was used to initiate vessel tracking. Only 14 cases were tested and the detection sensitivity was reported as 67% for the pulmonary main, lobar, and segmental arteries. As appreciated, these studies were limited to sample sizes, hindering a solid performance evaluation.

Thus, there remains a continuing need for new technologies capable of detecting pulmonary arterial emboli with high sensitivity and reliability.

SUMMARY

The present disclosure overcomes the aforementioned drawbacks by providing systems and methods that facilitate tracing the pulmonary trunk, and left and right arteries, and detecting and marking central PE candidates. A rule-based approach is provided that effectively and efficiently guides analysis.

In accordance with one aspect of the disclosure, a system for detecting pulmonary embolisms in a subject's vasculature is provided. The system includes an input configured to receive images acquired from a subject, and a processor configured to process the images with steps including receiving, using the input, a set of images representing a vasculature of the subject's lungs, and analyzing the set of images to segment the main arteries associated with the subject's lungs and separate the main arteries from surrounding tissues. The processor is also configured to carry out steps for extracting pulmonary embolism candidates from the set of images after segmenting and separating the main arteries, evaluating the pulmonary embolism candidates in three-dimensional (3D) space by applying a series of rules, and generating a report indicating evaluated candidate pulmonary embolisms. The system further includes an output for displaying the report.

In accordance with another aspect of the disclosure, a method for detecting central pulmonary embolisms in a subject's vasculature. The method includes receiving, using the input, a set of images representing a vasculature of the subject's lungs, automatically analyzing the set of images to segment the main arteries associated with the subject's lungs and separate the main arteries from surrounding tissues. The method also includes automatically extracting central pulmonary embolism candidates from the set of images after segmenting and separating the main arteries, and automatically evaluating the central pulmonary embolism candidates in three-dimensional (3D) space by applying a series of rules. The method further includes automatically displaying a report indicating evaluated central pulmonary embolism candidates on a display.

The foregoing and other advantages of the invention will appear from the following description. In the description, reference is made to the accompanying drawings, which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

A system and method for detecting pulmonary embolisms (PEs) in a subject's vasculature are provided. In particular, a novel approach is herein described, based on tracing the pulmonary trunk, and left and right arteries, that allows the detection and marking of central pulmonary arterial emboli candidates. A rule-based implementation is also utilized providing efficient and effective guidance. The system and method may be used alone or may be a part of a broader computer aided diagnosis (CAD) system for PE detection to help improve a radiologist performance.

There are several challenges preventing current technologies from reliably detecting central pulmonary arterial emboli. First, certain tissues, such as the superior vena cava, may come in close proximity to pulmonary arteries on contiguous images, hence obscuring or interfering with the visibility of PEs. Therefore, the present disclosure recognizes the importance of separating pulmonary arteries from such adjacent non-arterial enhancing structures. Second, structures near the pulmonary arteries can also create a relatively hypointense, or "dark" region between the structure in question and the adjacent pulmonary artery, which may cause a false positive detection. Third, certain tissues surrounding the pulmonary artery, such as lymph nodes, may have attenuation values similar to PE.

Recognizing these constraints, the present disclosure provides a system and method capable of differentiating PEs from adjacent tissues, particularly in the case when an artery is fully occluded by a PE. A similar situation can occurs when a PE is in contact with the vessel wall and needs to be differentiated if a vascular narrowing or an embolus exists. The system and method of the present disclosure can also facilitate differentiation in this situation. Lastly, irregular borders, poor image quality and various artifacts can further cause false positives. The system and method of the present disclosure are designed to overcome these challenges that plague traditional CAD or analysis systems, allowing accurate PE detection.

Figure 1:
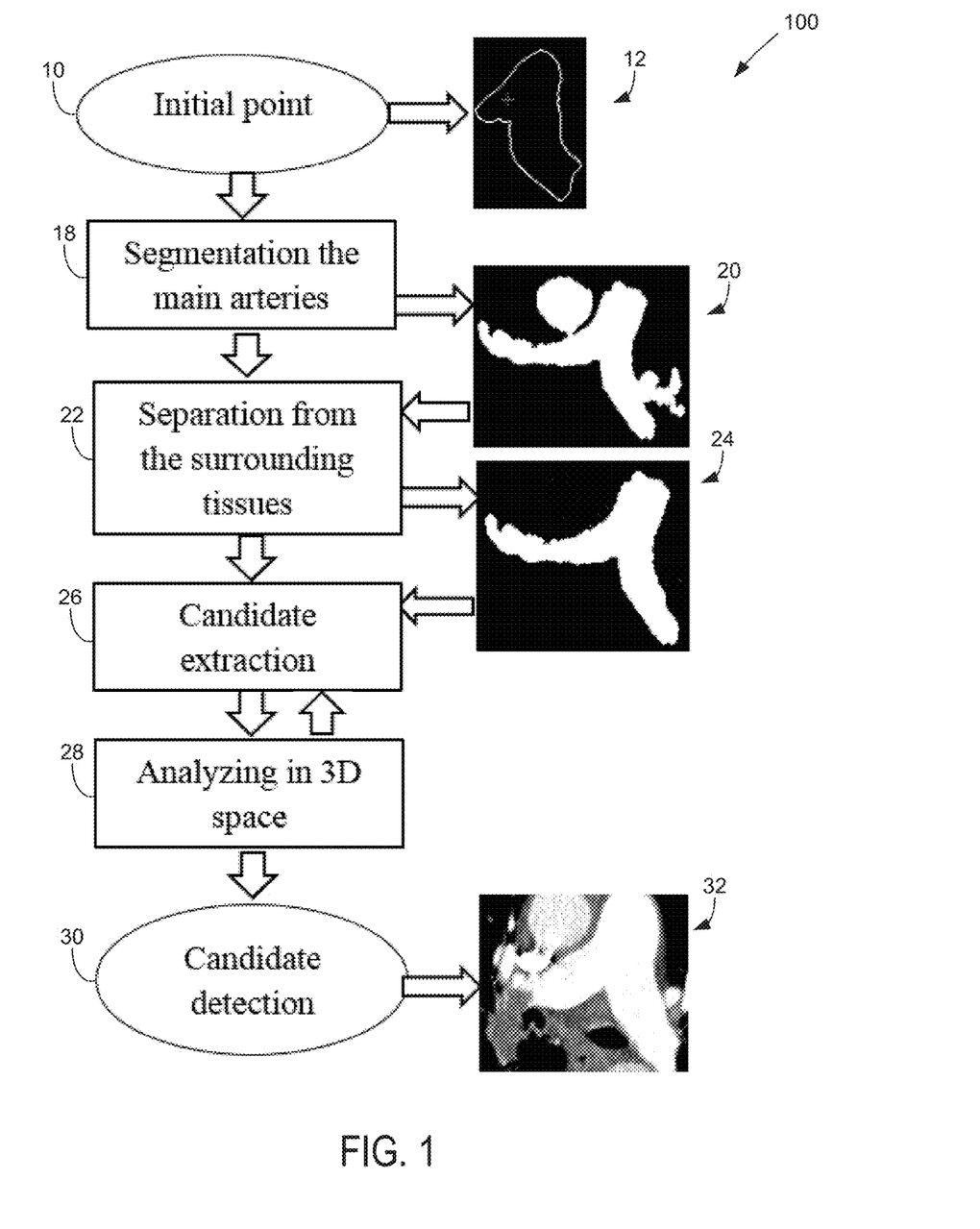
FIG. 1 is a flow chart setting forth some non-limiting examples of steps for detecting a central pulmonary embolisms in accordance with the present disclosure.

Referring to FIG. 1, some non-limiting steps are provided for an automated process 100 for detecting of central pulmonary emboli, in accordance with aspects of the present disclosure. The process 100 may be carried out using a system as described with reference to FIG. 5, or any other suitable system. The process 100 may begin with acquiring or accessing image data, and in particular image data representing a subject's vasculature. In some aspects, the acquired image data may include a set of three-dimensional (3D) images, such as computed tomography pulmonary angiogram (CTPA) images.

Figure 2:
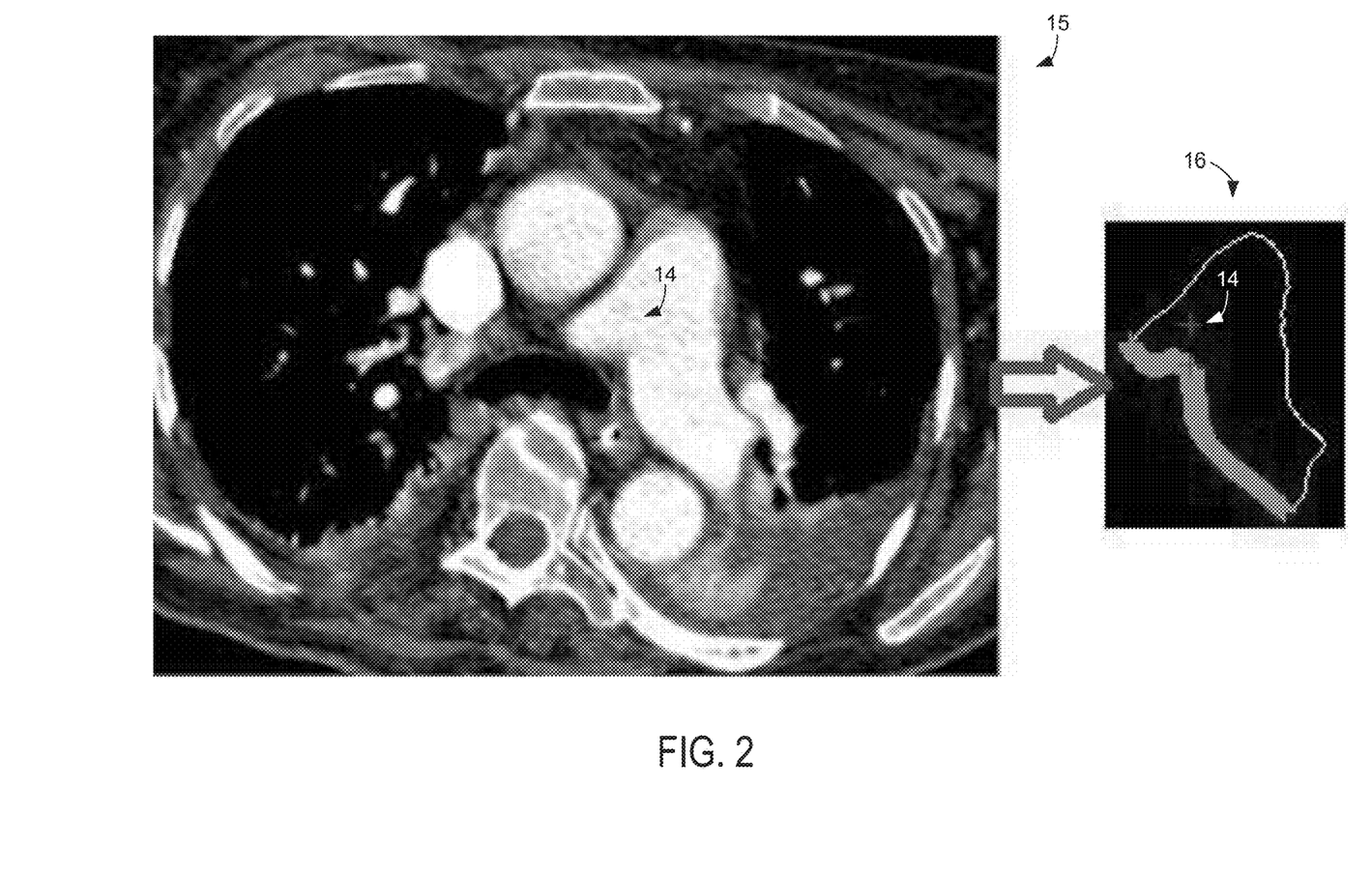
FIG. 2 is a graphic illustration of a process for generating an initial seed point in accordance with the present disclosure.

In processing an acquired or accessed image to identify the presence of central pulmonary emboli, an initial point detection may be performed at process block 10. The initial point detection may be performed automatically, or semi-automatically using input from a user. This is illustrated in the example image 12 and further shown in FIG. 2. Referring specifically to FIG. 2, to perform initial point detection, an initial seed point 14 described by coordinates $(x_0, y_0, z_0)$ can be identified or selected using an initial image 15. By way of example, the seed point 14 may a point located just cranial to the bifurcation of the main pulmonary artery, as illustrated FIG. 2. To facilitate the identification or selection of the initial seed point 14, in some aspects, the initial image 15 may be further processed. For instance, as shown in FIG. 2, a masking image or boundary image 16, illustrating pulmonary artery tissue, for example, may be generated by processing the initial image 15 using a number of segmentation, thresholding and/or boundary or edge detection techniques.

Referring again to FIG. 1, with an initial seed point in place, segmentation of the main arteries may then be performed at process block 18 using the acquired or accessed image. In particular, in a first step for detecting central PEs, the pulmonary trunk and main pulmonary arteries can be can be identified and segmented. As shown in FIG. 1, a first segmented image 20 identifying these arteries may be generated at process block 18. In some aspects, the contrast or intensity level of the pulmonary trunk may be used to determine an appropriate threshold for segmentation. That is, rather than using a preselected threshold value, the threshold value may be dynamically adapted for each image, or image set. In one non-limiting example, a mean contrast or intensity value computed using approximately 10 pixel squares around the initial seed point determined at process block 10 may be used for the adaptive threshold selection.

As the tissues surrounding the pulmonary arteries may have a similar intensity range to the pulmonary trunk and the main pulmonary arteries, they may appear connected to the regions of interest on the image, and may cause false positives. Some of these tissues may create the appearance of a "dark" region between the main arteries and the tissue in question, and be interpreted as a PE by the system. Thus, it may be desirable to perform error checking in an automated or other fashion.

The first segmented image 20 obtained at process block 18 may then be used to perform a separation of surrounding tissue, as indicated by process block 22. Specifically, the main arteries, namely the left and right arteries, may be extracted and separated from their surrounding tissues by using vertical and horizontal line from the initial seed point determined at process block 10. In some aspects, a vessel edge tracking algorithm may be used. In particular, high value changes on the edges, which accounts for slices, are considered as connected tissues. New edges are generated after removing these tissues. In some aspects, a connected component analysis can be performed to determine the connectivity of the segmented vessels.

The separation performed at process block 22 may yield a second segmented image 24 that is appropriate for PE candidate extraction at process block 26, as shown in the example of FIG. 1. Based thereon, 3D space may analyzed at process block 28. That is, the algorithm may continue to run iteratively through candidate extraction at process block 26 and 3D space analysis at process 28 until it reaches the bifurcation point of each artery as shown in FIG. 3.

Figure 3:
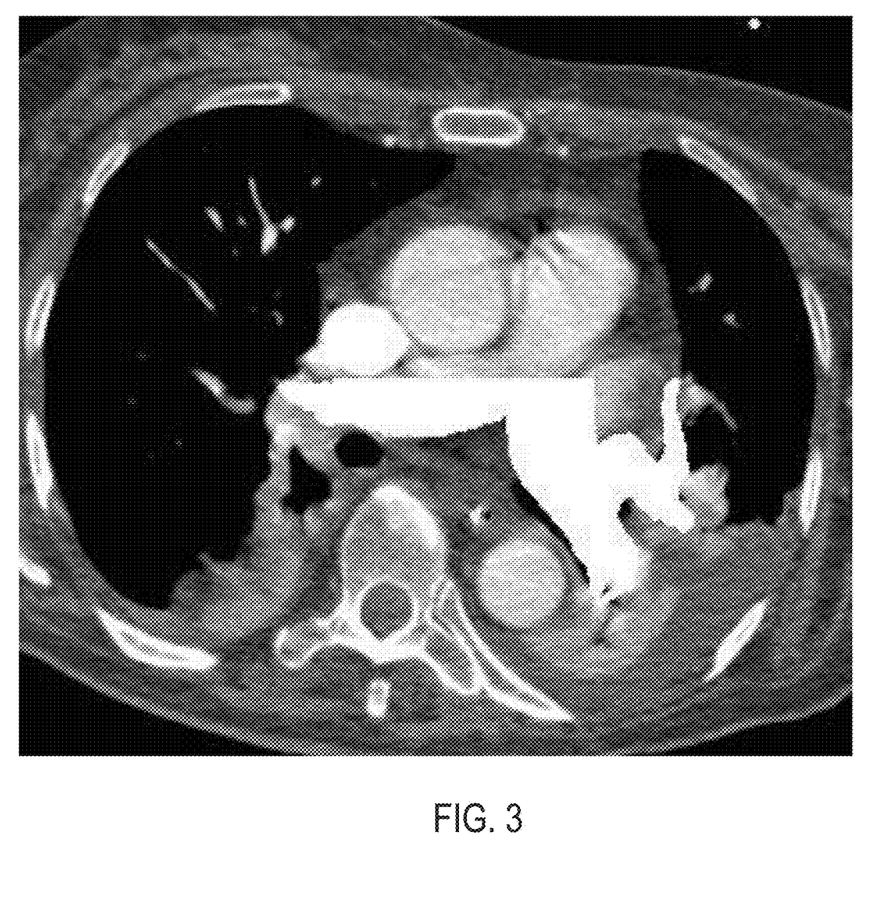
FIG. 3 is a non-limiting example image illustrating segmented right and left pulmonary arteries in accordance with the present disclosure.

That is, as illustrated in FIG. 3, right and left pulmonary arteries have been segmented. Morphologic opening and filling operations can be performed to disconnect some of the surrounding tissues like the superior vena cava and fill the holes in the region. The pulmonary trunk and the main arteries can be extracted using connected component labeling obtained from the 2D images and reconstructed in 3D space for analyses at process block 28 of FIG. 1.

More particularly, the pulmonary trunk and the main arteries can be searched separately for a hypo-attenuated or "dark" region either connected to the vessel wall or floating within the vessel lumen. The pulmonary trunk and left main artery can be traced from the cranial to the caudal direction, with the edges compared on each side of vessel. The right main artery can be traced from right to left with the cranial and caudal vessel edges compared. The sum of intensity values in the binary image can be compared to a variety of thresholds, such as with the number of pixels between the two edges. If the difference is greater than a predetermined threshold, such as a threshold selected based on a meaningful difference (such as a 5 pixel difference), then it may be determined that there is a hypo-attenuating focus within the vessel. Any such hypo-attenuating regions can be considered to be embolic candidates, and moved from the 2D image to be analyzed in 3D space.

Any small pieces appearing on only one image can be removed using a logical operator. In this way these pieces can also be evaluated against rules or thresholds. For example, pieces that are more than a rule or threshold, such as being more than two voxels in height and/or width, may be automatically selected as candidates. As another example of a rule or threshold that may be applied, if the average intensity value of the candidate region is between, as a non-limiting example, −100 HU and 200 HU, then the region may be automatically chosen as a pulmonary embolus candidate. Using this process, a candidate detection can be automatically performed, as indicated by process block 30.

Figure 4:
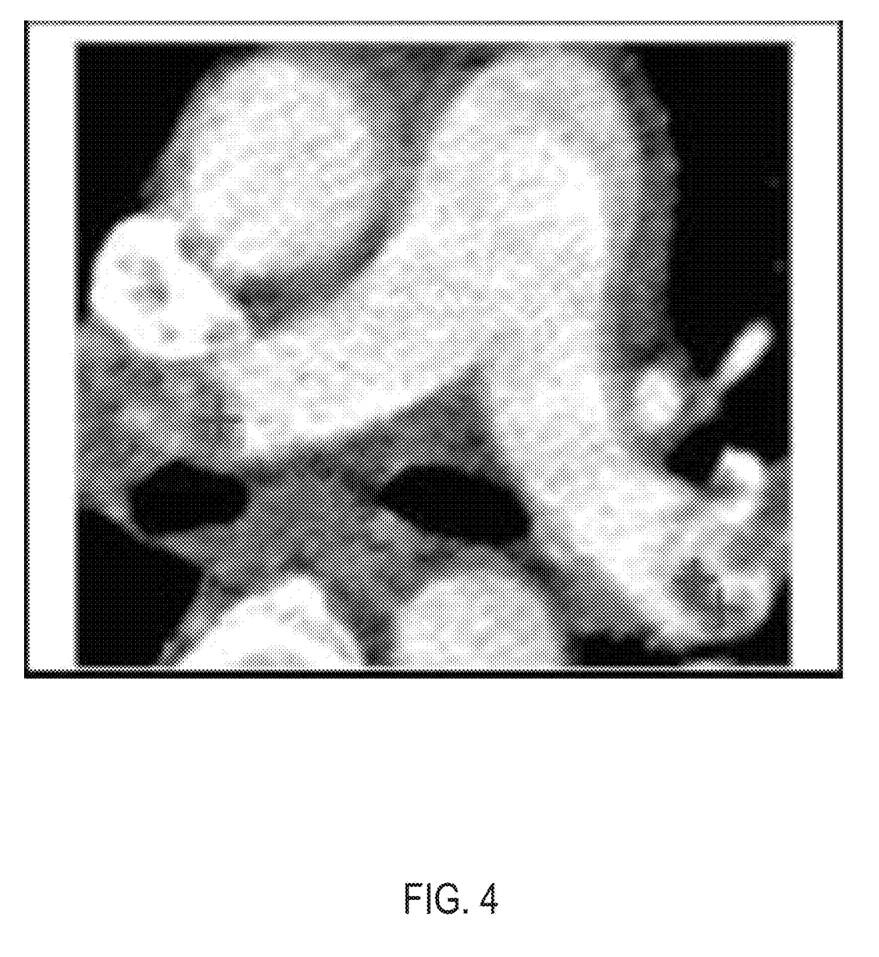
FIG. 4 is a non-limiting example image illustrating detection of central PE in pulmonary arteries in accordance with the present disclosure.

A report may then be provided or displayed either intermittently or in substantially real time, and may include a variety of information, including information associated with PEs, and particularly central PEs, detected. In some aspects, the report may be in the form of one-dimensional, two-dimensional, such as example image 32 in FIG. 1, or three-dimensional images that highlight various regions or volumes of interest, including detected PE candidates and PEs, as well as non-PE structures, such as vessels, lungs, and other tissues or organs. More particularly, the report may identify or mark the locations of identified PEs candidates, as illustrated in the example shown in FIG. 4. The report may also indicate the probabilities or confidence scores for identified objects being PEs. The report may further provide an audio alert or signal to an operator upon identification of PEs.

It can be a challenge for a computer program to distinguish an embolus in contact with the vessel wall from vascular narrowing. Vascular edges normally narrow as they approach bifurcation points, but the degree of change on consecutive CTPA images in the caliber of a normal vessel is slight for a given pulmonary artery. In contrast, if the vascular caliber changes rapidly, it is then it can be assumed an embolus candidate may be present. The vessel edge changes may be kept in an array and the vessel edge analysis was performed in 3D to differentiate these possibilities.

One non-limiting example study applying the above-described process used 55 cases with 24 central emboli. Each case consisted of 400-650 DICOM (Digital Imaging and Communications in Medicine) formatted images with 512×512 voxels and slice thickness is approximately 0.67 mm. Among the cases, 13 cases had suboptimal image quality, but they were included in the study in order to evaluate the robustness of our proposed algorithm. That is, cases with poor image quality and artifacts were not discarded. The sensitivity of the system was 96%, the FP/ds rate is 0.59, and only one false negative (FN) occurred where the vessel was completely obstructed by emboli. The central PE locations marked by the proposed system were confirmed by an experienced reviewer.

Figure 5:
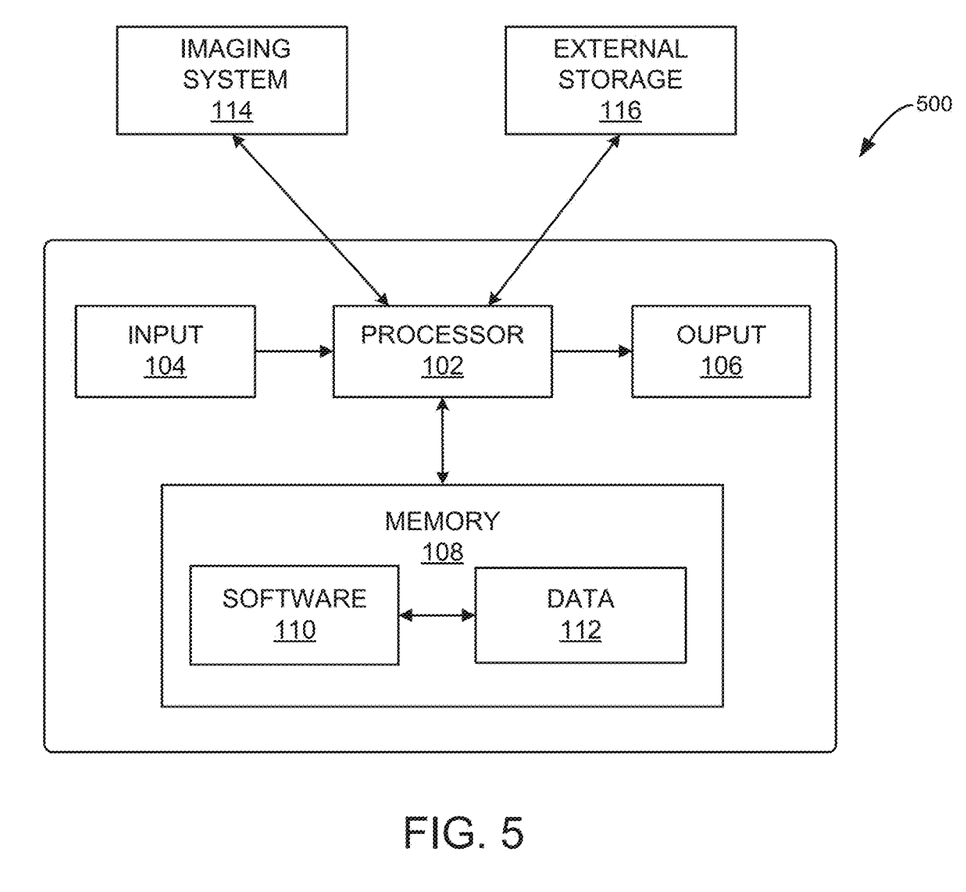
FIG. 5 is a block diagram of a system in accordance with the present disclosure and designed to perform the steps described with respect to FIG. 1 and deliver results, such as described with respect to FIGS. 2-4.

Turning now to FIG. 5, a block diagram of an example system 500 for detecting pulmonary embolisms in a subject's vasculature is provided. The system 500 may generally include a processor 102, an input 104, an output 106, and a memory 108 having software 110 and data 112 stored therein. For example, the system 500 may be a workstation, a notebook computer, a personal digital assistant (PDA), a multimedia device, a network server, a mainframe or any other general-purpose or application-specific computing device. In some aspects, the system 500 may be portable, such as a mobile device, laptop, tablet, or other portable device or apparatus. The system 500 may operate as part of, or in collaboration with a computer, system, device, machine, mainframe, or server, and so forth. In this regard, the system 500 may be any computing device, apparatus or system configured for carrying out instructions in accordance with aspects of the present disclosure.

The system 500 may integrate a variety of software, hardware capabilities and functionalities, and operate autonomously or semi-autonomously. In some aspects, the system 500 may read executable instructions, stored in the memory 108 as transitory and/or non-transitory computer-readable media. The system 500 may also receive instructions, information or data from a user, or any other source logically connected thereto, such as another system, device, apparatus, networked computer, server, database, the internet, a cloud, and so forth.

In some implementations, as shown in FIG. 5, the processor 102 may be in communication with an imaging system 114 and/or an external storage 118, and configured to exchange a wide variety of data and information, including imaging data, therebetween. By way of example, the imaging system 114 may be a computed tomography (CT) system, a fluoroscopy system, a magnetic resonance (MR), system, an ultrasound (US) system, and so forth. The system 500 may be configured to acquire image data and analyze the data in substantially real-time. Alternatively, the system 500 may also be configured to access, retrieve and analyze image data already stored in memory 108, external storage 116, or other data location.

In addition to being configured to carry out steps for operating the system 500, the processor 102 may be configured to acquire and/or process image data, including image data obtained during a medical procedure, such as a pulmonary angiography. As such, the processor 102 may read and execute instructions stored on a non-transitory computer-readable medium. In particular, the processor 102 may be configured to acquire or access image data, such as two-dimensional and/or three-dimensional CT pulmonary angiography (CTPA) data representing a vasculature of the subject, and analyze the image data as described above. In some implementations, a user may provide various selections for different regions or volumes of interest using the input 104, such as a mouse, keyboard, touchpad, touch screen, buttons, and others.

In accordance with aspects of the disclosure, the processor 102 may transform and process acquired or accessed image data, in accordance with the present disclosure. As described, such representation affords many advantages, including consistent PE appearance that allows for accurate detection.

A report may then be generated by the processor 102, and provided via the output 106, which may include an audio and/or visual display system. The report may be provided either intermittently or in substantially real time, and may include a variety of information, including information associated with pulmonary embolisms detected. For example, the report may include CTPA images that highlight various regions or volumes of interest, including detected PE candidates and PEs, as well as non-PE structures, such as vessels, lungs, and other tissues or organs. The report may also indicate the probabilities or confidence scores for identified objects being PEs. The report may also include an audio alert or signal to an operator upon identification of PEs.

The present invention has been described in terms of one or more embodiments, and it should be appreciated that many equivalents, alternatives, variations, and modifications, aside from those expressly stated, are possible and within the scope of the invention. The appended document describes additional features of the present invention and is incorporated herein in its entirety by reference.

The invention claimed is:

1. A system for detecting pulmonary embolisms in a subject's vasculature, the system comprising:
    an input configured to receive images acquired from a subject;
    a hardware processor configured to process the images by at least:
        i. receiving, using the input, a set of images representing a vasculature of the subject's lungs;
        ii. analyzing the set of images to segment the main arteries associated with the subject's lungs and separate the main arteries from surrounding tissues;
        iii. extracting pulmonary embolism candidates from the set of images after segmenting and separating the main; arteries by:
            tracing a pulmonary trunk in the set of images in a cranial to caudal direction;
            summing intensity values of binary image pixels based on the set of images to form a sum;
            comparing the sum to a threshold; and
            identifying a hypo-attenuating focus when the sum is greater than the threshold;
        iv. evaluating the pulmonary embolism candidates in three-dimensional (3D) space; and
        v. generating a report indicating evaluated candidate pulmonary embolisms; and
    an output for displaying the report.

2. The system of claim 1, wherein the set of images comprises computed tomography pulmonary angiography (CTPA) images.

3. The system of claim 1, wherein the set of images comprises three-dimensional (3D) images.

4. The system of claim 1, wherein processor is further caused to trace a right main artery from one side of the right main artery to another side of the right main artery and compare edges of the right main artery.

5. The system of claim 1, wherein the processor is further configured to apply a logical operator to identify pieces that only appear in one of the set of images within the series of images and meet a threshold criteria and to identify these pieces meeting the threshold criteria as candidate pulmonary embolisms.

6. The system of claim 5, wherein the threshold criteria include a size of more than 2 voxels in height and width or having an image intensity of between −100 HU and 200 HU.

7. A method for detecting central pulmonary embolisms in a subject's vasculature, the method comprising:
    receiving, using the input, a set of images representing a vasculature of the subject's lungs;
    automatically analyzing the set of images to segment the main arteries associated with the subject's lungs and separate the main arteries from surrounding tissues;
    automatically extracting central pulmonary embolism candidates from the set of images after segmenting and separating the main arteries by:
        automatically tracing a pulmonary trunk in the set of images in a cranial to caudal direction, summing intensity values of binary image pixels based on the set of images to form a sum, comparing the sum to a threshold;
    identifying a hypo-attenuating focus when the sum is greater than the threshold;

automatically evaluating the central pulmonary embolism candidates in three-dimensional (3D) space by applying a series of rules; and automatically displaying a report indicating evaluated central pulmonary embolism candidates on a display.

8. The method of claim 7, wherein the set of images comprises computed tomography pulmonary angiography (CTPA) images.

9. The method of claim 7, wherein the set of images comprises three-dimensional (3D) images.

10. The method of claim 7, further comprising automatically tracing a right main artery from one side of the right main artery to another side of the right main artery and compare edges of the right main artery.

11. The method of claim 7, further comprising automatically applying a logical operator to identify pieces that only appear in one of the set of images within the series of images and meet a threshold criteria and identifying these pieces meeting the threshold criteria as candidate pulmonary embolisms.

12. The method of claim 11, wherein the threshold criteria include a size of more than 2 voxels in height and width or having an image intensity of between −100 HU and 200 HU.

* * * * *

UNITED STATES PATENT AND TRADEMARK OFFICE
CERTIFICATE OF CORRECTION

PATENT NO. : 10,157,467 B2
APPLICATION NO. : 15/231730
DATED : December 18, 2018
INVENTOR(S) : Esra Dincer, Michael Gotway and Jianming Liang Page 1 of 1

It is certified that error appears in the above-identified patent and that said Letters Patent is hereby corrected as shown below:

In the Claims

Column 8, Line 20, "main; arteries by" should be --main arteries by--.

Signed and Sealed this
Twenty-fifth Day of June, 2019

Andrei Iancu
*Director of the United States Patent and Trademark Office*